United States Patent [19]

Minamisono et al.

[11] Patent Number: 4,893,350
[45] Date of Patent: Jan. 9, 1990

[54] INTERFERENCE CANCELLATION SYSTEM

[75] Inventors: Kenichi Minamisono; Masayuki Yasunaga; Fumio Watanbe, all of Tokyo; Noboru Baba, Sayama, all of Japan

[73] Assignee: Kokusai Denshin Denwa Co., Ltd., Tokyo, Japan

[21] Appl. No.: 196,205

[22] PCT Filed: Oct. 21, 1987

[86] PCT No.: PCT/JP87/00806
§ 371 Date: Mar. 14, 1988
§ 102(e) Date: Mar. 14, 1988

[87] PCT Pub. No.: WO88/03340
PCT Pub. Date: May 5, 1988

[30] Foreign Application Priority Data
Oct. 22, 1986 [JP] Japan .................................. 61-249532
Jul. 13, 1987 [JP] Japan .................................. 62-173013

[51] Int. Cl.$^4$ .............................................. H04B 1/06
[52] U.S. Cl. ..................................... 455/278; 342/381; 455/272
[58] Field of Search ............... 455/278, 272, 273, 283, 455/284, 307, 304, 343, 276, 226; 342/379, 380, 381, 382

[56] References Cited

U.S. PATENT DOCUMENTS 3,978,483  8/1976  Lewis et al. ......................... 455/278
4,075,633  2/1978  Lewis ................................... 342/381
4,742,568  5/1988  Furuya ................................. 455/278

Primary Examiner—Robert L. Griffin
Assistant Examiner—Curtis Kuntz
Attorney, Agent, or Firm—Armstrong, Nikaido, Marmelstein, Kubovcik & Murray

[57] ABSTRACT

An interference cancellation system has a combiner which removes an undesired component from a main signal including both a desired signal and an undesired signal received by a main antenna. A power sensor measures output power of a main signal. A weight control circuit is coupled with an output of the power sensor. An auxiliary antenna receives an undesired signal. A variable complex weight control circuit adjusts an undesired signal from the auxiliary antenna according to the output of the weight control circuit to provide an input signal to the combiner. The variable complex weight control circuit operates so that the output power becomes a minimum.

3 Claims, 5 Drawing Sheets

INTERFERENCE CANCELLATION SYSTEM

FIELD OF THE INVENTION

The present invention relates to an interference cancellation system which cancels undesired interference waves in the direction of side lobes of a receiver antenna.

BACKGROUND OF THE INVENTION

An interference cancellation system cancels undesired waves which are received by a high gain antenna positioned in the direction of a desired signal, by combining the desired signal with an undesired signal received by another antenna positioned in the direction of the undesired wave, the same amplitude and opposite phase.

FIG. 5 shows a prior interference cancellation system. In FIG. 5, an output signal of a main antenna (1) (which is called a main signal) is converted to an intermediate frequency signal by a local oscillator (5) and a mixer or a combiner (3). An output signal of an auxiliary antenna (2) which is called a reference signal is, after being converted to an intermediate frequency signal by a local oscillator (5) and a mixer (4), combined with a weighting signal w which is the output of a weight control circuit (8) in a variable complex weight circuit (7), so that a presumed signal of an undesired signal included in a main signal is provided. The numeral (6) is a combiner which functions to subtract the presumed undesired signal from the main signal. The output of the combiner (6) is the output of the interference cancellation system. The reference signal is multiplied with the output signal of the interference cancellation system in the multiplier (10). The numeral (9) is a low-pass filter, and the combination of the multiplier (10) and the low-pass filter (9) provides a correlation circuit. The output of the correlation circuit is applied to the variable complex weight circuit (7) through the weight control circuit (8) so that a correlation loop is provided. The correlation loop senses a residual component of an undesired signal included in the output signal.

DRAWBACKS OF A PRIOR ART

In the above structure, when both the desired signal and undesired signal are wideband signals, a mutual spectrum density function is spread over a wide frequency range. Further, since those signals are random signals, the average of a correlation value is not constant, but deviates. Therefore, a prior correlation circuit with a multiplier (10) and a low-pass filter (9) is not enough for providing an accurate correlation value, and an undesired signal is not sufficiently cancelled. This fact is the problem in a prior interference cancellation system.

SUBJECT OF THE INVENTION

An object of the present invention is to overcome the disadvantage of the prior art.

It is also an object of the present invention to provide an excellent interference cancellation system irrespective of the bandwidth and/or modulation system of a signal, by using the power of an output signal.

The important feature of the present invention is the use of a feedback loop which adjusts phase and amplitude of a reference signal so that the signal power contained in the desired signal band (which is called inband power) becomes minimum.

PREFERRED EMBODIMENTS OF THE INVENTION

The theoretical explanation of the present invention is summarized as follows. Assuming that d is a desired signal component, and i is an undesired signal component, and n is a noise component, a main signal x is expressed as follows.

$$x = d + i + n \tag{1}$$

A reference signal y has undesired signal component $i_a$ and noise component $n_a$. When the ratio $i_a/n_a$ in an auxiliary antenna is sufficiently large, y is expressed as follows.

$$y = i_a + n_a \simeq i_a \tag{2}$$

The following relation is satisfied between i and $i_a$.

$$i_a = k \cdot \exp(j \cdot \theta) \cdot i \tag{3}$$

where k is a gain ratio of two antennas in the direction of an undesired signal, and is the phase difference which relates to the difference in the propagation path length. An output signal z of the interference cancellation system is expressed as follows by using the above symbols.

$$z = d + (1 - w \cdot K) \cdot i + n \tag{4}$$

where $K = k \cdot \exp(j \cdot \theta)$ \hfill (5)

If no correlation exists among d, i and n, the power of the output signal z is expressed as follows.

$$E[|z|^2] = E[|d|^2] + E[|1 - w \cdot K|^2 \cdot |i|^2] + E[|n|^2] \tag{6}$$

where $E[|z|^2]$ is the average power of the output signal z. Therefore, it should be noted that an undesired signal is sufficiently cancelled by determining a weight signal w so that the power of an output signal z becomes minimum. Equation (6) shows that the power of the output signal z has the minimum value. To determine the weight signal w, an ordinary method of minimizing a function which has two real variables is applicable. Therefore, it is easy to determine the weight signal w.

Figure 1:
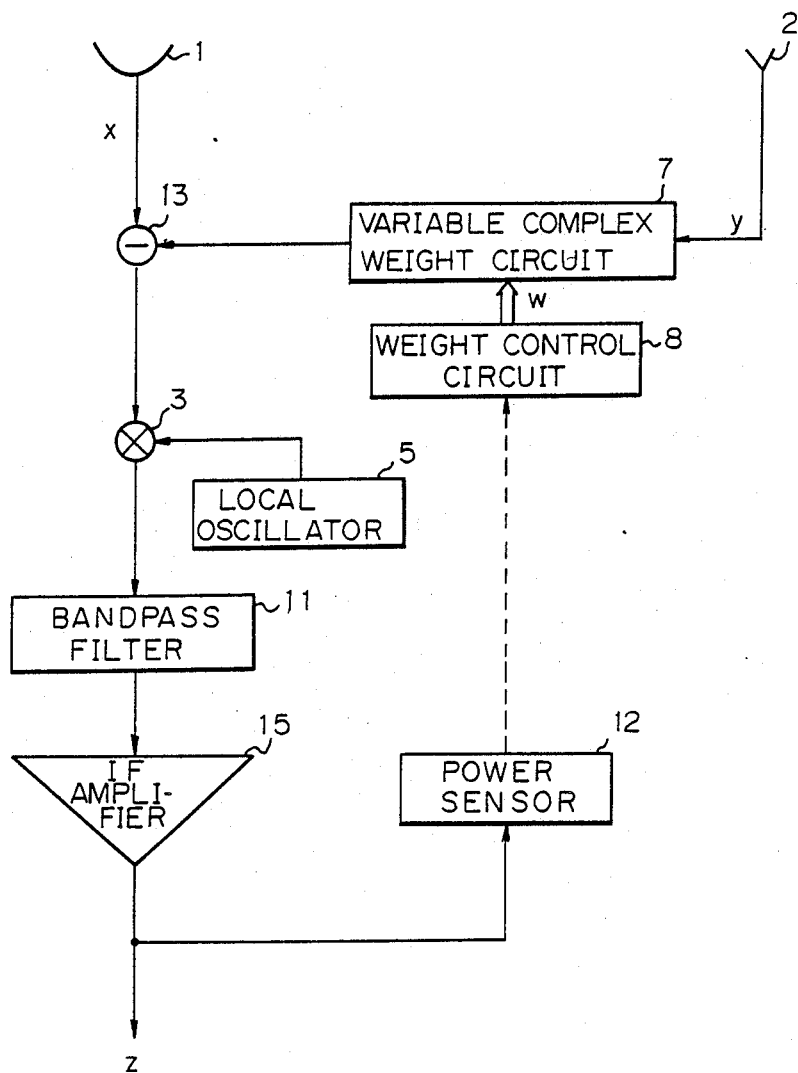
FIG. 1 is a first embodiment of the present invention.

FIG. 1 shows the first embodiment which uses the above theory of the present invention. In FIG. 1, an output signal y (which is a reference signal) of an auxiliary antenna (2) is multiplied with a weight signal w which is the output of a weight control circuit (8), to provide a presumed undesired signal in an output signal x (main signal) of a main antenna (1). The numeral (13) is a combiner which functions to subtract the presumed undesired signal from the main signal. The output of the combiner (13) is converted to an intermediate frequency signal by a local oscillator (5) and a mixer (3). The numeral (11) is a bandpass filter which passes proper bandwidth relating to that of the desired signal. The numeral (15) is an intermediate frequency amplifier. The output of the intermediate frequency amplifier (15) is the output z of the present interference cancellation system. The numeral (12) is a power sensor which measures inband power of the output signal z. An output information of the power sensor (12) is applied to the weight control circuit (8). The weight control circuit (8) determines the weight signal w so that the inband power in the output signal z becomes minimum, and the weight signal w is applied to the variable complex weight circuit (7). The weight signal w is obtained by minimizing the function which has two real variables as mentioned before. Therefore, the weight control circuit is implemented simply by using a micro processor. An embodiment operation of the weight control circuit is as follows.

(Initial Operation)

This operation determines the initial values for the optimum control operation which is described later. The initial operation carries out the following operations.

(a) The initial value $w_0$, the variable range of the amplitude ($\delta$), and the variable range of the phase ($\phi$) of the weight signal w are arbitrarily given.

(b) The output signal power is measured when the value of the weight signal w is $w_0$.

(c) The amplitude and the phase of the weight signal are shifted by ($\delta$), and ($\phi$), respectively, from the initial value $w_0$, and the output signal power for each shifted values are measured (4 shifted values, or 8 shifted values are tested).

(d) The output signal powers measured in the items (b) and (c) are compared with one another, and the weight signal $w_1$ which provides the minimum signal power is obtained.

(e) When the value $w_1$ which is obtained in the item (d) differs from $w_0$, the value $w_0$ is substituted by the value $w_1$, and the operations after the item (b) are repeated.

When the value $w_1$ is equal to $w_0$, then, the values ($\delta$) and ($\phi$) are halved.

(f) When the values ($\delta$) and ($\phi$) reach lower than the predetermined values, then, the initial operation finishes, and the next optimum control operation begins. Otherwise, the operation after the item (b) is repeated.

(Optimum Control Operation)

The optimum control operation is carried out so that the weight signal w follows the optimum value, and includes the following operations.

(g) The weight signal w is set to the final value $w_0$ which is obtained in the above initial operation. The values ($\delta$) and ($\phi$) are set to a small value, so that the output signal is not affected significantly by those values.

(h) The output signal power is measured, when the weight signal is $w_0$.

(i) The output signal power is measured, when the phase of the weight signal is shifted by $\pm 0$ from $w_0$.

(j) The output signal powers measured in items (h) and (i) are compared with each other, and the weight signal which provides the minimum output power is obtained. The value which provides the minimum output power is regarded as a new final value $w_0$.

(k) The weight signal w is set to $w_0$, and the output signal power for the revised weight signal is measured.

(l) The output signal power is measured when the amplitude of the weight signal is shifted by ($+\delta$) from $w_0$.

(m) The output signal powers obtained in the items (k) and (l) are compared with each other, and the weight signal which provides the minimum output signal is obtained. That value is regarded as a new final value $w_0$.

(n) The items after (h) are repeated.

It should be appreciated that the above operation is only one example, and any method for obtaining the minimum value of a two variable function can be used in the present invention. For instance, a Newton-Lafson method, a method of steepest descent, a conjugate gradient method, or a random search method can be used in the present invention.

In the embodiment of FIG. 1, when the amplitude and the phase of the reference signal are controlled with the errors less than 0.2 dB, and 1.8° degrees, respectively, through the necessary bandwidth, the undesired signal is suppressed by more than 32 dB.

As understood in equation (6), the weight signal w does not depend upon the power level of the desired signal, the undesired signal, and the noise. Therefore, the present invention is useful even when S/N (the ratio of the signal power to the noise power), or D/U (the ratio of the desired signal power to the undesired signal power) is small. For instance, when S/N=10 dB, D/U=−10 dB, and k=10, the present invention can suppress the undesired signal by more than 30 dB.

FIG. 1 shows the embodiment which measures the power at the intermediate frequency stage. As an alternative, the power may be measured at the baseband stage.

Figure 2:
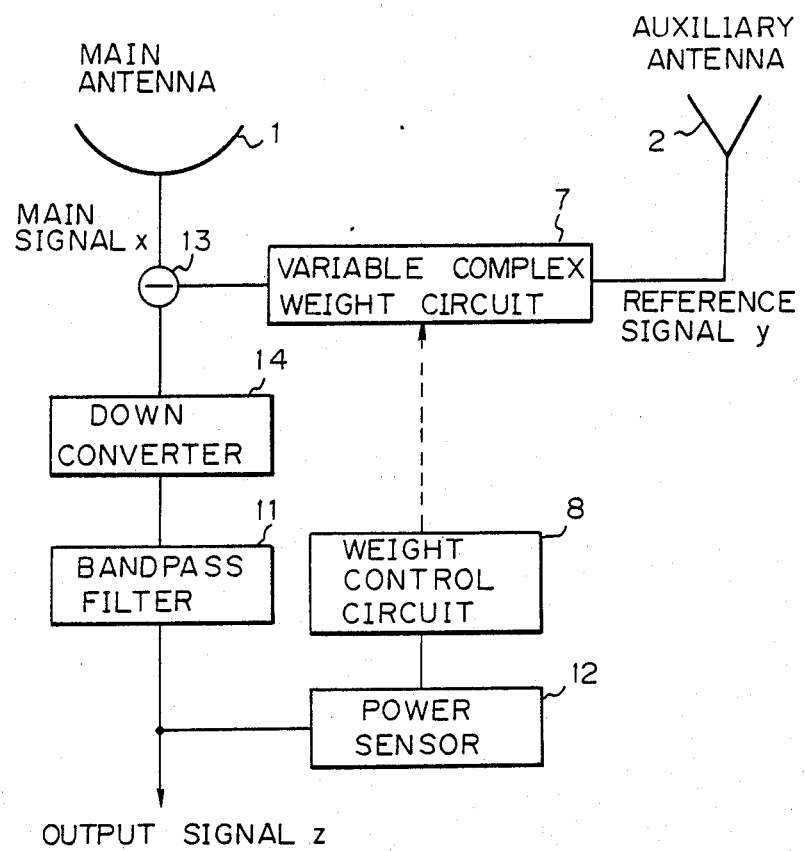
FIG. 2 is a modification of the first embodiment.

FIG. 2 shows the modification of the embodiment of FIG. 1. The features of FIG. 2 are the use of a down converter (14) instead of a local oscillator (5) and a mixer (3), and the deletion of an intermediate frequency amplifier (15). The circuit of FIG. 2 has the similar effect to that of FIG. 1.

Figure 3:
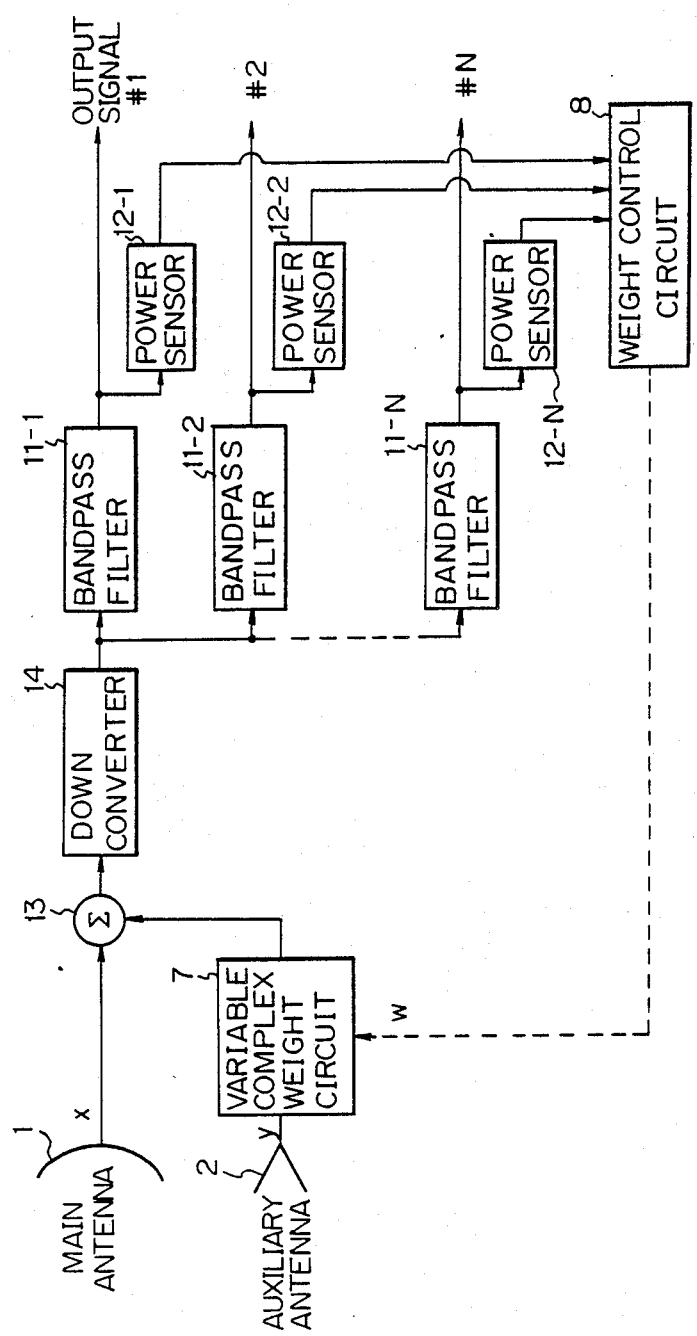
FIG. 3 is a second embodiment of the present invention.

FIG. 3 shows another embodiment of the present invention. The embodiment of FIG. 3 is useful when there are a plurality of desired signals like a multi-carrier communication system which includes FDMA (Frequency Division Multiple Access), and all of those desired signals are interfered by undesired signals.

In FIG. 3, the output signal y of the auxiliary antenna (2) is multiplied to the output signal w of the weight control circuit (8) so that the product which is the presumed undesired signal included in the output signal x of the main antenna (1) is obtained. The numeral (13) is a combiner which functions to subtract the presumed undesired signal from the main signal. The output of the combiner (13) is converted to the intermediate frequency signal by a frequency converter (14) which is implemented by a down-converter. The numerals (11-1) through (11-N) are bandpass filters, each of which passes a signal of each bandwidth of each desired signal. The numerals (12-1) through (12-N) are sensors which measure signal power in each bandwidth of each desired signal. The outputs of the sensors (12-1) through (12-N) are applied to a weight control circuit (8), which determines the weight signal w so that output powers of each of the sensors become minimum.

Since the embodiment of FIG. 3 handles only the signal included in each bandwidth of each desired signal, it is useful to compress the undesired signal in a multi-carriers communication system.

An example of the operation of the weight control circuit is as follows.

(a) The average received power level $d_{on}$ (n=1...N) of each desired signal is calculated. That calculation is generally carried out in the link design stage.

(b) The output power $z_{on}$ (n=1 through N) of each bandpass filter is obtained. Then, the difference from $d_{on}$ is calculated as follows.

$$P_n = E[|Z_{on}|^2] - d_{on} \; (n=1-N) \quad (7)$$

(c) The value $n_0$ which gives the maximum difference ($P_n$) is obtained, and the value w is determined so that ($P_{no}$) becomes minimum. The above control is essentially a step track of two variables. Other non-linear optimum methods are available in the present invention.

(d) The steps (b) and (c) are repeated.

Figure 4:
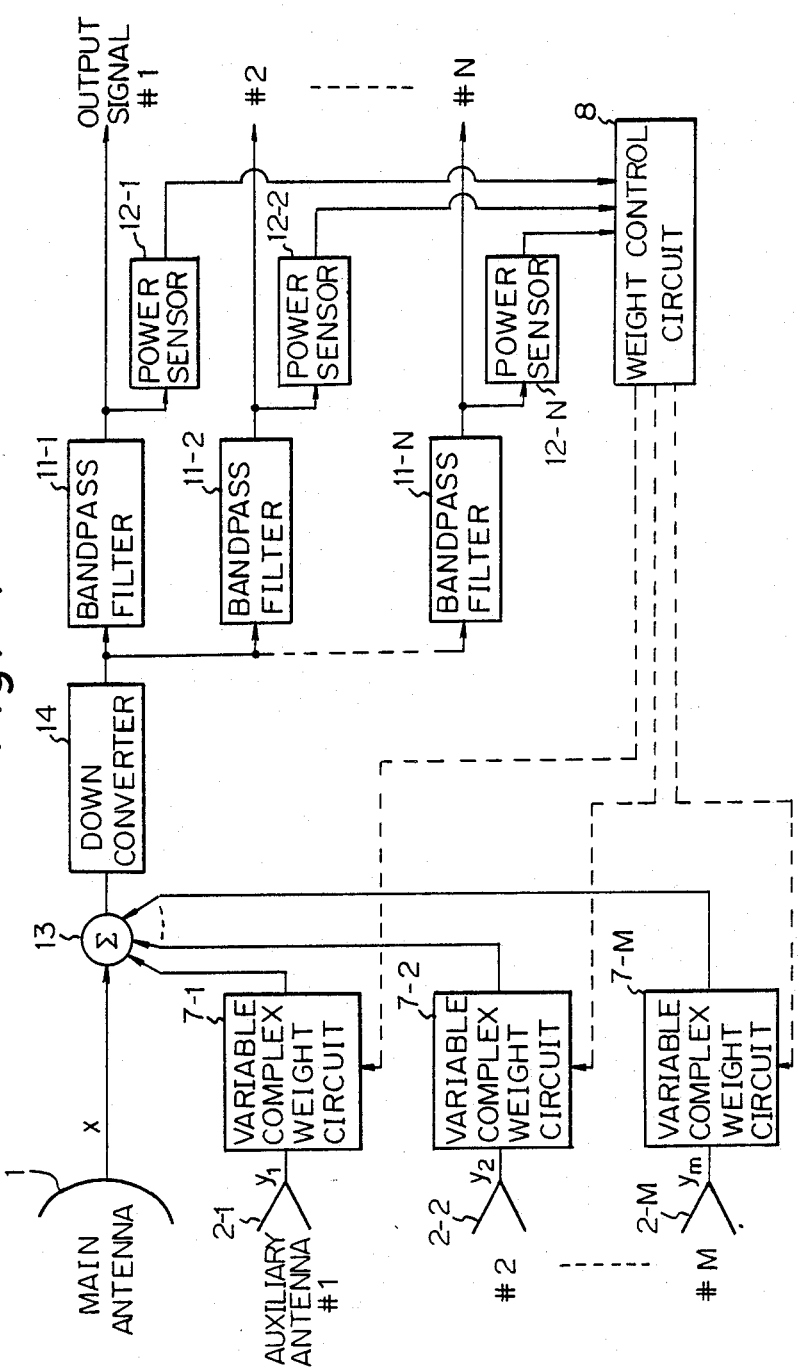
FIG. 4 is a third embodiment of the present invention.
Figure 5:
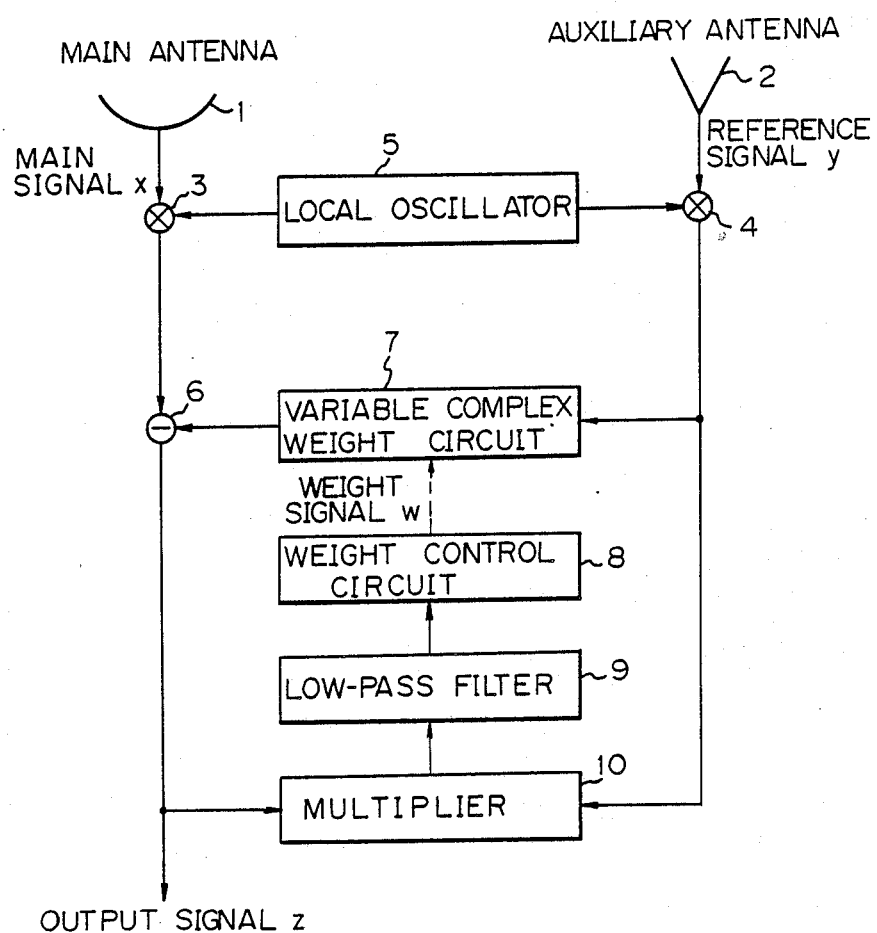
FIG. 5 is a block diagram of a prior interference cancellation system.

FIG. 4 shows a block diagram of still another embodiment of the present invention. The feature of FIG. 4 is the improvement of the embodiment of FIG. 3 so that a plurality of undesired signals are cancelled. In FIG. 4, the numerals (2-1) through (2-M) are auxiliary antennas, each of which receives an undesired signal in a different direction from each other. The output signal $y_m$ (m=1 through M) is multiplied with $w_m$ (m=1 through M), which is output from the weight control circuits (8), and the product is the presumed undesired signal for cancelling the undesired signal in the output signal x of the main antenna (1). The numeral (13) is a combiner which functions to subtract the presumed undesired signal from the main signal. The output of the combiner (13) is frequency-converted by the down-converter (14) so that an intermediate frequency signal is obtained. The numerals (11-1) through (11-N) are bandpass filters for passing desired signals in each desired band. The numerals (12-1) through (12-N) are power sensors, each of which measures output power in each bandwidth of each desired signal. The outputs of the power sensors (12-1) through (12-N) are applied to the weight control circuit (8), which determines the weight signal $w_m$ (m=1 through M) so that the inband power in each bandwidth of each desired signal becomes a minimum.

One example of the operation of the weight control circuit (8) is as follows.

(a) The average receive power level $d_{on}$ (n=1 through N) of each desired signal is calculated. That power level is generally calculated at the link design stage.

(b) The output power $z_{on}$ (n=1 through N) of each bandpass filter is obtained, and the following value is calculated.

$$P_n = [E\{|Z_{on}|^2\} - d_{on}]/d_{on} \; n=(1-n) \quad (8)$$

(c) The following object function is introduced.

$$Q = \Sigma P_n \quad (9)$$

The value $\{w_m\}$ (m=1 through M) is determined so that the object function Q becomes for a set of $\{W_m\}$ of complex weight signals.

(d) The steps (b) and (c) are repeated.

Although simple control operations are shown for the embodiments of FIGS. 3 and 4, other conventional optimum methods for multi-object functions can be used in the present invention.

EFFECT OF THE INVENTION

The effects of the present invention are enumerated as follows.

(1) The control is accurate, since the inband power of an output signal is used, instead of a prior correlation value. Therefore, an undesired signal is suppressed sufficiently due to a small error signal, and the circuit structure is simple.

(2) Even when both the desired signal and the undesired signal are wideband signals, and the signal to noise ratio (S/N) of the main antenna is small, excellent suppression of undesired signal is obtained, since the inband output power can be measured accurately even in the above cases.

(3) The excellent suppression effect of an undesired signal is obtained even when the undesired signal level is higher than the desired signal level.

(4) The excellent compression effect of an undesired signal is obtained even for a multi-carrier communication system like FDMA, by measuring only the signal power included in the bandwidth of each of the desired signals.

(5) Even when there are a plurality of undesired signals, the present invention is applicable.

APPLICATION TO INDUSTRY

The present invention can compress an undesired signal in a wideband communication system, and the structure of the circuit is simple. Therefore, the present invention is useful in particular for that communication system.

What is claimed is:

1. An interference cancellation system which receives a main signal, including a desired signal and an undesired signal in a direction of a sidelobe of a main antenna, and a reference signal, which has essentially only the undesired signal, said interference cancellation system suppressing an undesired signal component in the main signal to provide a main signal which has only a desired signal component, said interference cancellation system comprising:

a main antenna positioned in a direction of the desired signal;

an auxiliary antenna positioned in a direction of the undesired signal;

a subtractor coupled with an output of said main antenna;

an output terminal coupled with an output of said subtractor;

power measuring means, coupled with the output of said subtractor, for measuring a power of the output of said subtractor in a high frequency band;

a variable complex weight circuit, coupled with said auxiliary antenna and said subtractor, said variable complex weight circuit adjusting the undesired signal received by the auxiliary antenna; and control means, coupled to said variable complex weight circuit and said power measuring means, for controlling said variable complex weight circuit according to said output power.

2. An interference cancellation system according to claim 1, wherein at least two power measuring means are provided, each having a bandwidth and a center frequency relating to each desired signal, said variable complex weight control circuit being controlled so that outputs of each of the power measuring means becomes a minimum.

3. An interference cancellation system according to claim 1, wherein a plurality of variable complex weight control circuits and a plurality of auxiliary antennas are provided for each of a plurality of undesired signals received from various directions.

* * * * *